United States Patent
Ejstrup Hansen

(10) Patent No.: US 12,344,514 B2
(45) Date of Patent: Jul. 1, 2025

(54) AUTONOMOUS MOBILE ROBOT SYSTEM FOR TRANSPORTING PAYLOADS

(71) Applicant: MOBILE INDUSTRIAL ROBOTS A/S, Odense (DK)

(72) Inventor: Michael Ejstrup Hansen, Morud (DK)

(73) Assignee: MOBILE INDUSTRIAL ROBOTS A/S, Odense (DK)

(*) Notice: Subject to any disclaimer, the term of this patent is extended or adjusted under 35 U.S.C. 154(b) by 0 days.

(21) Appl. No.: 17/768,154

(22) PCT Filed: Oct. 21, 2020

(86) PCT No.: PCT/EP2020/079576
§ 371 (c)(1),
(2) Date: Apr. 11, 2022

(87) PCT Pub. No.: WO2021/078777
PCT Pub. Date: Apr. 29, 2021

(65) Prior Publication Data
US 2023/0376045 A1    Nov. 23, 2023

(30) Foreign Application Priority Data
Oct. 25, 2019    (EP) .................................... 19205336

(51) Int. Cl.
*B66F 9/06* (2006.01)
*B60W 30/09* (2012.01)

(52) U.S. Cl.
CPC ............. *B66F 9/063* (2013.01); *B60W 30/09* (2013.01); *B60W 2420/40* (2013.01)

(58) Field of Classification Search
CPC ...... G05D 1/0242; G05D 1/0214; B66F 9/063
See application file for complete search history.

(56) References Cited

U.S. PATENT DOCUMENTS

| 10,168,711 B2 | 1/2019 | Reynolds et al. |
| 10,844,171 B2 | 11/2020 | Chen et al. |

(Continued)

FOREIGN PATENT DOCUMENTS

| CN | 102077057 A | 5/2011 |
| CN | 103201695 A | 7/2013 |

(Continued)

OTHER PUBLICATIONS

MIR 100 User Guide, Mobile Industrial Robots A/S, Odense, SO, (Aug. 2018). V. 1.1. (pp. 1-42), 44 p. (Year: 2018).*

(Continued)

*Primary Examiner* — David P. Merlino
*Assistant Examiner* — Shivam Sharma
(74) *Attorney, Agent, or Firm* — ArentFox Schiff LLP

(57) ABSTRACT

The present invention provides a transport system comprising an Autonomous Mobile Robot (AMRs) (1) and the equipment to be moved (2), which can be operated safely and efficiently within an industrial/commercial environment, while the AMRs (1), as well as the equipment to be moved (2), can be produced in a cost-efficient way. A particular object of the invention is to: providing supporting members (4) of the equipment to be moved, which have no or only a negligible impact on the safety system, providing equipment to be moved (2) which can carry heavy payloads, preferably of hundreds and thousands of kilograms; providing a safety sensor system for an AMR, which can provide protective zones (5) around the AMR and the equipment to be moved and where the supporting members (4) of the equipment to be moved (2) have no or only a negligible impact on the safety of transportation. Another object of the invention is the correct attachment of the cart/shelf (2) to the AMR (1) is ensured before and during driving.

20 Claims, 6 Drawing Sheets

(56) References Cited

U.S. PATENT DOCUMENTS

2017/0072558 A1 3/2017 Reynolds et al.
2017/0129705 A1* 5/2017 Luc .................... B65G 1/1378

FOREIGN PATENT DOCUMENTS

| CN | 108639695 A | 10/2018 |
|---|---|---|
| CN | 108972500 A | 12/2018 |
| CN | 109797996 A | 5/2019 |
| DE | 102011085019 A1 | 4/2012 |
| WO | 2012052554 A2 | 4/2012 |
| WO | 2015/121818 A2 | 8/2015 |
| WO | 2018/213931 A1 | 11/2018 |
| WO | 2019063816 A1 | 4/2019 |

OTHER PUBLICATIONS

WO 2019053798 A1, Matsushita Yuusuke, Autonomous Traveling Robot System, (Mar. 2019) (Year: 2019).*
International Search Report for International Patent Application No. PCT/EP2020/079576, mailed Nov. 30, 2020, 4 pages.
Written Opinion for International Patent Application No. PCT/EP2020/079576, mailed Nov. 30, 2020, 11 pages.
MIR 100 User Guide. Mobile Industrial Robots A/S. Odense, SO. (Aug. 2018). V. 1.1, (pp. 1-42), 44 pages.
MIR 100 User Guide. Mobile Industrial Robots A/S. Odense, SO. (Nov. 2017). V. 1.0, (pp. 1-37), 39 pages.
Mobile Industrial Robots, MIRFleet, Reference Guide, v.1.0, 32 pages (Jan. 2017).
CN Office Action mailed Aug. 15, 2024 for Application No. Cn 202080065505.X (with English Translation 26 pages).
Sick safety scanners: https://cdn.sick.com/media/docs/3/13/613/Operating [cdn.sick.com] instructions S300 Safety laser scanner en IM0017613.PDF, p. 70.
File History of European Patent Application No. 19205336.1, downloaded on Nov. 14, 2024, 230 pages.
International Preliminary Report on Patentability received for PCT Patent Application No. PCT/EP2020/079576, mailed on May 5, 2022, 11 pages.
Office Action in Chinese Patent Application No. 202080065505.X dated Apr. 18, 2025 (with English Translation).

* cited by examiner

AUTONOMOUS MOBILE ROBOT SYSTEM FOR TRANSPORTING PAYLOADS

CROSS-REFERENCE TO RELATED APPLICATIONS

This application is a U.S. national stage entry of PCT Application No. PCT/EP2020/079576, which was filed on Oct. 21, 2020. PCT Application No. PCT/EP2020/079576 claims priority to European Patent Application No. 19205336.1, which was filed on Oct. 25, 2019. This application claims priority to PCT Application No. PCT/EP2020/079576 and to European Patent Application No. 19205336.1. The contents of PCT/EP2020/0795 and European Patent Application No. 19205336.1 are incorporated herein by reference.

FIELD OF INVENTION

The present invention relates to mobile robot systems for transporting goods and payloads with autonomous mobile robots (AMRs), which are configurable for moving carts, wheeled shelves and other equipment holding items or manipulators, including the payload placed on such equipment. More specifically, the invention relates to an AMR where the equipment to be moved is designed for allowing the AMR to move under the equipment, interconnect with it, possibly (slightly) lift the equipment, and thereafter move or roll safely the equipment including its payload to the intended destination.

BACKGROUND OF INVENTION

Autonomous mobile robots (AMRs) are used for moving carts, wheeled shelves and other equipment holding items or manipulators including payload placed on such equipment.

In general, the equipment to be moved has a frame or is placed onto a frame with supporting members (legs, wheels, etc.) allowing for the AMR to move underneath it, interconnect with it, possibly (slightly) lift the equipment, and thereafter relocate the equipment.

AMRs for industrial use are specifically designed for safe autonomous driving. AMRs safety system includes means for detecting obstacles in a predefined protective zone around the AMR and means for bringing the AMR to a stop safely before colliding with any obstacle detected within a defined protective zone. A known solution for detecting obstacles all around the AMR is mounting two laser scanners opposite each other at corners of a typically rectangular AMR. Each scanner usually covers a 270° field of view, i.e., from one side of the AMR to another side for a corresponding corner. Thereby the two scanners can cover a protective zone around the AMR.

Examples of known scanner solutions are safety scanners from the company Sick [1].

While AMRs as such are designed for safe autonomous driving when nothing impedes vision of their laser scanners, however, moving an attached equipment or payload frame with supporting members nearby the laser scanners challenges the safety system and adds risks of not detecting an obstacle timely. The supporting members located nearby the laser scanners create blind spot areas where obstacles would not be detected. This is especially relevant to AMRs having their propulsion means (e.g., driving wheels) situated near the center of the AMR's bottom allowing the AMR to make an angular turn on the spot.

A U.S. Pat. No. 10,168,711 by Omron discloses a mobile platform and a cart for moving a payload.

The Omron Adept mobile platform has a scanner in the front. There is used a cart where the front support members are designed so that they are out of view of the front scanner, placed in the middle of the front of the mobile robot. Further, the Omron mobile robot is equipped with 3 additional scanners to cover a safety area at each side and the back of the cart, respectively. This is an expensive and complicated solution, as each mobile robot must be equipped with 4 scanners. Further, the scanners at the side of the robot are placed on bars protruding from the mobile robot. Thereby the mobile robot has an enlarged footprint, regardless of whether it is driving with or without a cart.

Another patent application WO2019/063816 by ROEQ Aps [3] discloses a system for connecting an autonomous mobile robot. The illustrated robot has a top module for connecting with and lifting a cart or a shelf. The challenge is that the AMR would normally have a protective zone on all 4 sides. The supporting means of the cart/shelf would be placed inside the normal protective zone on each side of the AMR, upon moving the AMR under the cart/shelf. Meanwhile, the protective zones in the driving directions are still active. As the mobile robot can turn around its center point, there is a risk that an obstacle at the side of the robot can be hit by cart/shelf especially its support means (possibly wheels), during the turning operation. Possible solutions to overcome this, are the protective zones at the sides of the robot are muted, whenever the mobile robot is under the cart/shelf. Alternatively, the protective zones at the side of the AMR can be made so narrow that they do not cover the support members of the cart or shelf. Such solutions are acceptable for smaller/light loaded AMRs providing a low safety risk, but could be dangerous, for a larger/heavy loaded AMR.

The object of the present invention is to overcome these drawbacks and provide a safe system for transporting heavy payloads by using AMRs. This application proposes an inventive system for safe transportation of goods and payloads with the help of AMR provided with a few, preferably two, safety scanners and by using payload shelves or carts having supporting members, where the resulting protective field at all four sides around the AMR provides sufficient safety for persons and/or obstacles near the moving/turning AMR.

SUMMARY

The present invention provides a transportation system comprising a combination of AMR and the equipment to be moved, which can be operated safely and efficiently within an industrial/commercial environment, while the AMRs, as well as the equipment to be moved, can be produced in a cost-efficient way.

As the footprint of the equipment to be moved, typically, is larger than the footprint of the AMR, the safety system of the AMR must be adapted to provide an enlarged protective zone around the whole equipment during the transport of the equipment. Another challenge is that the equipment to be moved, typically, would have some supporting members (legs, wheels, etc.) which stay under the equipment or frame, while moving. To prevent identifying these supporting means as obstacles within the protective zone, the combination of protective zones and supporting means must be designed so that there is no conflict for safety and/or the intended operation.

A particular object of the invention is to:

Providing relocation of supporting members of the equipment to be moved to positions where the supporting members have no or only a negligible impact on the safety system;

providing equipment to be moved, which can carry a payload of up to 250 kg, preferably up to 500 kg, more preferably up to 1000 kg, most preferably up to 2000 kg, and with no limitation to heavier payloads;

providing a safety sensor system for an AMR, which can provide protective zones around the AMR and the equipment to be moved and where the supporting members of the equipment to be moved have no or only a negligible impact on the safety.

Another object of the invention is that a correct attachment of the cart/shelf to the AMR is ensured before and during driving.

DESCRIPTION OF DRAWINGS

To understand the invention better and appreciate its practical applications, the following pictures are provided and referenced. Figures are given as examples only and in no way shall limit the scope of the invention.

FIG. 6a—side view of the AMR with the frame, FIG. 6b—front/back view of the AMR with the frame, FIG. 6c—a perspective view of the AMR with the frame.

DRAWINGS—REFERENCE NUMERALS

1 An autonomous mobile robot (AMR);
2 Equipment to be moved by the AMR, at least, cart/shelf on the supporting members (legs, wheels);
3 270° safety scanners (e.g., lidars) mounted on the opposite corners of the AMR;
4 supporting members (legs, wheels) of the equipment to be moved by the AMR;
5 A predefined protective area or protective zone of the tandem of the AMR and the cart/shelf;
6 Blind zones/angles created by configuring the protective zones of the safety scanner system to ignore objects within a certain angle range seen from the scanner.
7 Possible obstacles in the blind zones;
7.1 the obstacle nearby the center of the AMR, expected to be safe due to minimized turning velocity near the center of the AMR during the rotation of the AMR.
7.2 the obstacle further from the center of the AMR, expected to be safe due to a longer distance from the corner of the AMR during the rotation of the AMR.
7.3 the obstacle in the blind zone extending from the corner of the AMR, not reachable by the corners of the AMR during the rotation of the AMR.
3' imaginary positions of the safety scanners (e.g., lidars) when the AMR is precisely positioned and fixed under the equipment to be moved, cart or shelf.
4' imaginary positions of the supporting members, as the precise landmarks for the AMR to know precise positioning and fixing the AMR under the equipment to be moved, cart or shelf.
8 a narrow tolerance area around the supporting member which can be ignored for the blind zones.
9 embossed/raised area on the top of the AMR for slightly lifting and fixing AMR to the equipment to be moved (cart/shelf).
10 means on the frame of the cart/shelf for fixing the cart/shelf to the AMR for the transportation.

DETAILED DESCRIPTION OF PREFERRED EMBODIMENTS

It should be understood that numerous specific details are set out to provide a complete and comprehensive description of exemplary embodiments of the invention. However, a skilled person will understand that the level of details of embodiments does not limit the invention. Well-known methods, procedures, and components have not been described in detail to make sure that embodiments are not misleading. Furthermore, the description should not be construed as limiting the invention but as an implementation.

While the examples of the invention or aspects thereof, as shown and described, include a plurality of components depicted in a particular common space or location, some components may be far-off. It should be also understood that examples provided are not limited to the components described and include other elements necessary for their functioning and interaction with other components, the presence of which is self-evident and therefore not detailed.

Figure 1:
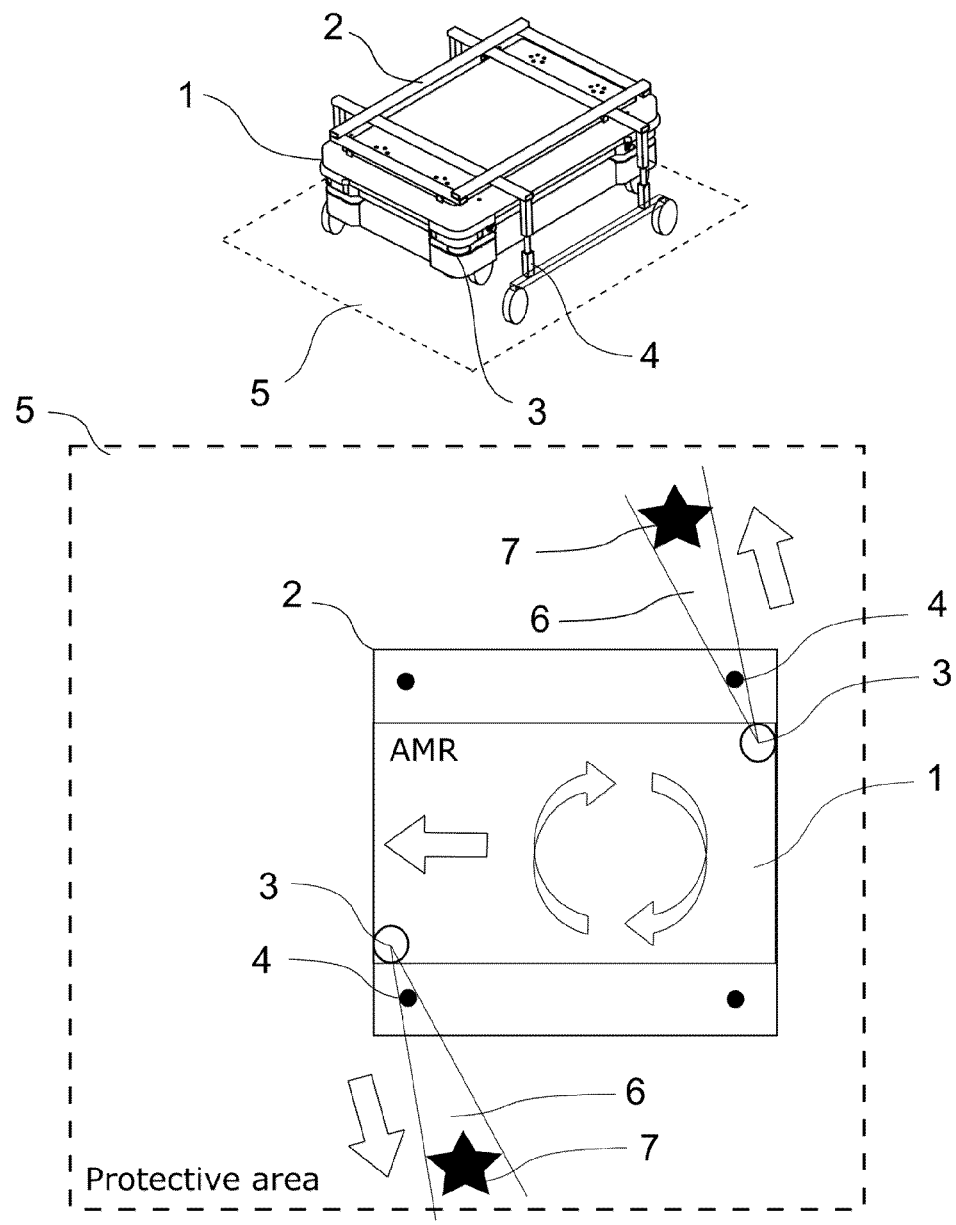
FIG. 1 depicts blind spots in the field of view of the AMR safety scanners when AMR is mated to a typical payload frame with four supporting members (legs, wheels) located nearby the sides of the AMR.

The basic problem and solution are depicted in FIG. 1. In the right upper corner of FIG. 1, an AMR with a cart attached is illustrated. The rectangular AMR 1 is equipped with two safety scanners (preferably, lidars) 3 at two opposite corners of the AMR. Each safety scanner 3 can scan in a 270° view, thereby covering an area at all four sides of the AMR 1. The safety scanner system is set up to establish a predefined protective area (safety zone) 5 at each of the four sides of the AMR 1. The protective zones 5 at the right and the left sides of the AMR 1 are needed to prevent obstacles 7 from being hit by the turning AMR 1. The problem is that the normal safety system of the AMR 1 would identify the cart/shelf 2 supporting elements 4 as obstacles and bring the AMR 1 to a stop. Prior art solutions compromise safety, costs and/or the efficiency or maximum payload of the transport system.

During driving without equipment, the protective zones 5 at each side of the AMR 1 are set up to cover a rectangular protective area 5. During docking under the equipment to be moved 2, the protective zones 5 at the left and right side of the AMR 1 are inactivated. After correct docking/attachment to the equipment 2, a new and larger protective zone 5 is set up to ignore the area, where the supporting member 4 is expected to be located. By making the supporting member 4 as thin as possible and by configuring the protective zone of the safety scanner 3 system so that an angle interval covering the supporting member 4 and a narrow tolerance sectors 8 around it is ignored (when the supporting elements 4 are in their correct positions), the blind angle 6 behind the supporting element 4 is kept relatively narrow. The advantage is that only relatively small objects can be overseen in a relatively short time at the start of the turning operation. Therefore:

Any misalignment between the AMR 1 and the equipment to be moved 2 is detected.

Unauthorized equipment and partly defect equipment are prevented from being moved.

Figure 2:
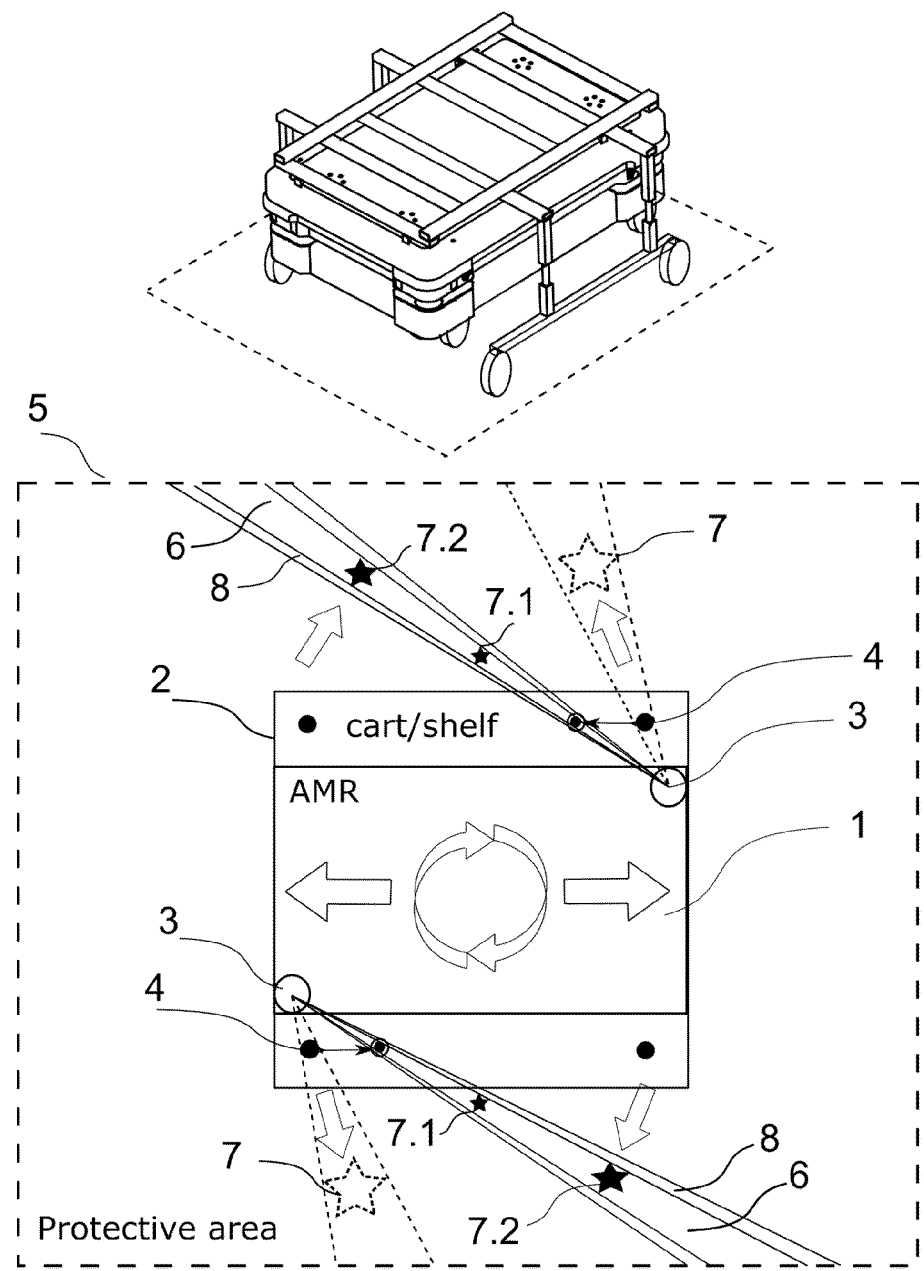
FIG. 2 depicts the most preferred embodiment of the present invention wherein the supporting members are distributed asymmetrically with respect to the AMR body and center, still being located by the sides of the AMR.

The preferred embodiment of the system presents the equipment to be moved—cart/shelf 2 with asymmetrically positioned supporting members 4. The picture in FIG. 2 illustrates the preferred embodiment, where the two supporting members 4 closest to the two (asymmetrically placed) safety scanners 3 are moved closer to the center of the side the cart/shelf 2, and possibly with the reduced diameter. Thereby an asymmetric supporting structure is provided.

The protective zone 5 of the safety scanner system is set up to ignoring the blind zone area 6 in an angle interval as narrow as practically possible around these supporting elements 4.

The blind angle 6 in the protective area 5 behind the supporting element 5 hereby is starting at the center of the sides of the AMR/cart/shelf and extending to the vicinity of the protective area 5 (close to a corner of the protective area 5).

If there should be an obstacle 7.1 in the blind angle 6 near the center at the side of the AMR 1, this is less serious, because there is only a relatively small and relatively slow displacement of the AMR 1 and cart/shelf 2 within this central side area during a turning operation. Additionally, the risk of the obstacle 7.1 being hit by a wheel of the AMR or possibly wheel of a cart/shelf 2 during a turning operation is low.

If there an obstacle 7.2 appears within the blind angle 6 close to the corner of the AMR 1, the active part of the protective area 5 would be moved relatively quickly, when the AMR 1 starts turning and thereby detecting the obstacle 7.2. When obstacle 7.2 is detected within the protective area 5 and outside of the blind zone 6 then the turning operation is stopped. The turning speed preferably is set low to allow a timely stop.

Figure 3:
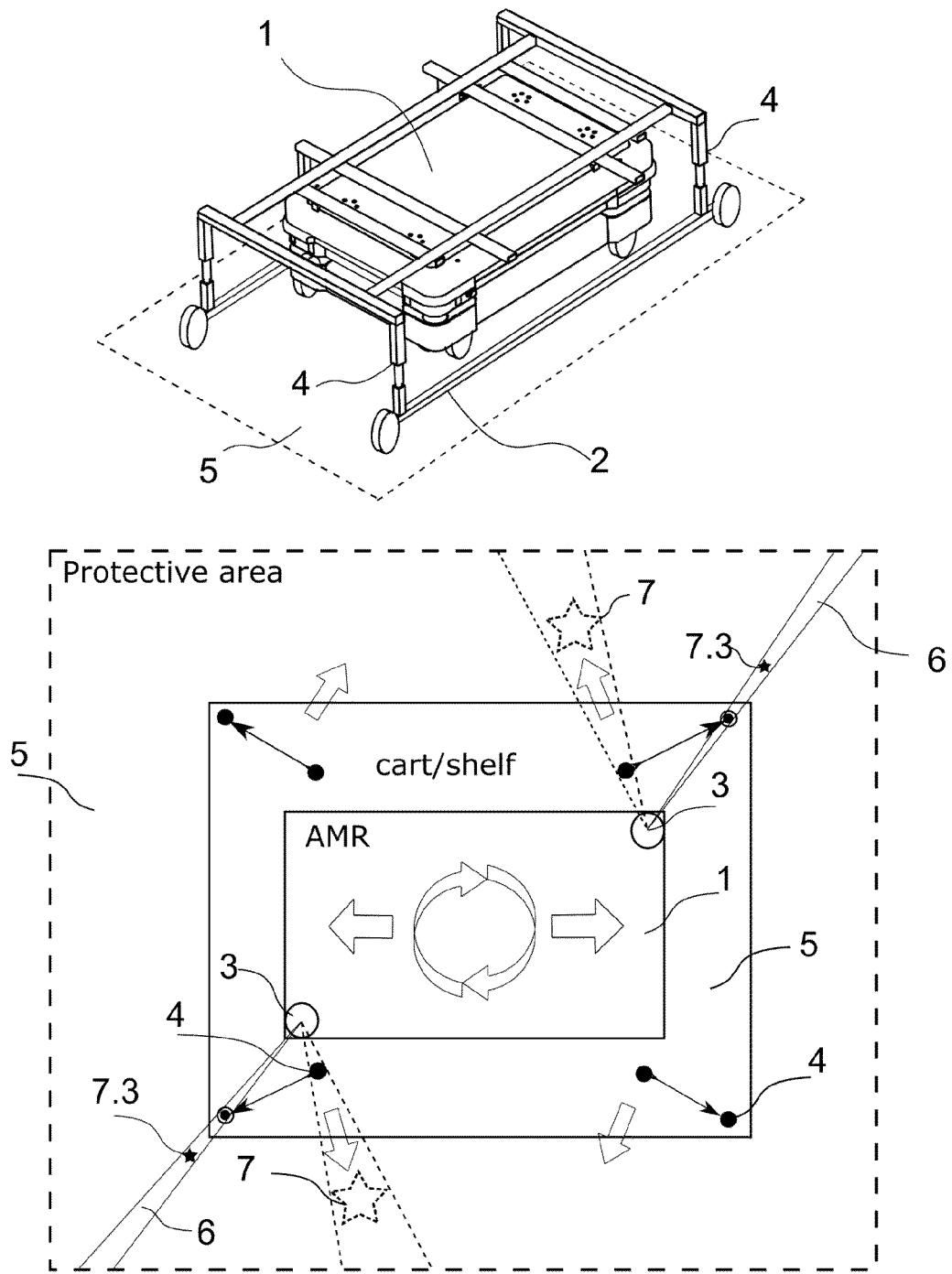
FIG. 3 depicts an alternative embodiment of the present invention wherein the supporting members are dislocated from the sides of the AMR to the extensions of corners of the AMR, or a frame/cart larger than AMR is used with the supporting members on its corners.

One alternative embodiment is presented in FIG. 3 wherein the supporting members 4 are allowed to be dislocated from the sides of the AMR 1 further to the extensions of the AMR corners, or a larger footprint cart 2 with the supporting members 4 on the corners is used, and the protective area 5 is enlarged correspondingly to at least the dimensions of the cart. This embodiment locates the blind zones 6 to outside from the corners of the cart/shelf 2. In case if the AMR 1 turns around its center, these blind zones 6 already do not endanger to hit any obstacles 7 around the AMR 1 and the cart/shelf 2. In this particular embodiment, there may occur a rare situation with a theoretic lane, where the obstacle 7 could stay hidden by the supporting member 4 for the safety scanner 3, e.g., when AMR turns by an extended arc and thereby gets very close or even makes contact with the supporting member 4. Still, it is possible to prevent such a situation by software means, by setting some special turning trajectories for the AMR.

Figure 4:
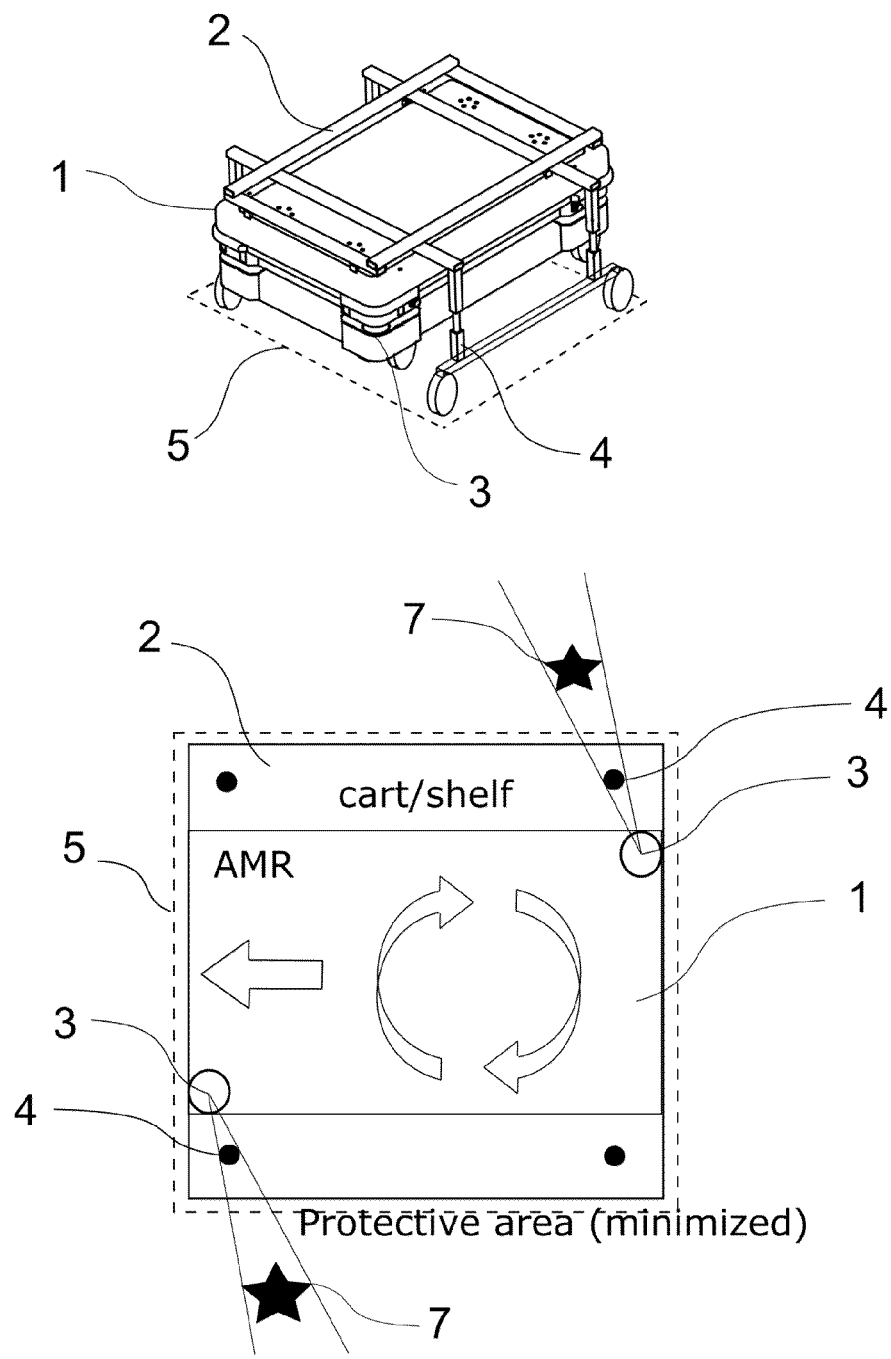
FIG. 4 depicts another alternative embodiment of the present invention wherein the protective field can be reduced to the perimeter of the cart taking into account non-dangerously light payload, slow motion of the AMR and possible visual and sonar signaling to the humans by the AMR. In this embodiment, the system is mainly used for identifying that the cart is in the correct position during the attachment or transport.

Another alternative embodiment is presented in FIG. 4 wherein the protective zone 5 is allowed to be reduced to the perimeter of the AMR 1 and the perimeter of the cart/shelf 2. This approach applicable if the payload is non-dangerously light, the motion of the AMR relatively slow, and the AMR 1 also provides clear visual and sonar signals for the humans. In such a case, the blind zones 6 do not endanger to injury the humans or damage the surrounding objects even if the AMR may slightly touch them during the motion.

In some solutions, AMR may comprise the added extra sensors. Then the blind zones/angles 6 on the AMR sides around the center, blind angles 6 (as in FIG. 2) can be avoided completely. As there are high safety requirements for these sensors, the cost of each robot would be increased, but the carts/shelves can be kept in a more traditional and simple design. Extra sensors could provide extra safety, but also extra costs and space. Safety scanners that have intended to protect humans against high risks, however, are relatively expensive. If combined with the cart modification, some smaller, cheaper sensors might be used, to decrease the residual risk. Another solution with additional equipment may employ projection of lidar beam with the help of additional mirrors. The projection is implemented via the mirror, and this can be an inexpensive solution for avoiding blind spots. However, in an industrial environment there is a risk that the mirrors would be covered with dirt, and after some time would not provide the expected safety. Also, a mirror setup would be very intolerant toward misalignments of mirrors/sensors.

To minimize risks due to turning, in general, it is required to have direction indicators on the AMR 1. Additionally, the AMR 1 can be programmed to make soft turns with reduced speed only. Also, enlarging the protective zone 5 could, in general, reduce the risk that a human being approaches to close to the driving/turning AMR 1.

Figure 5:
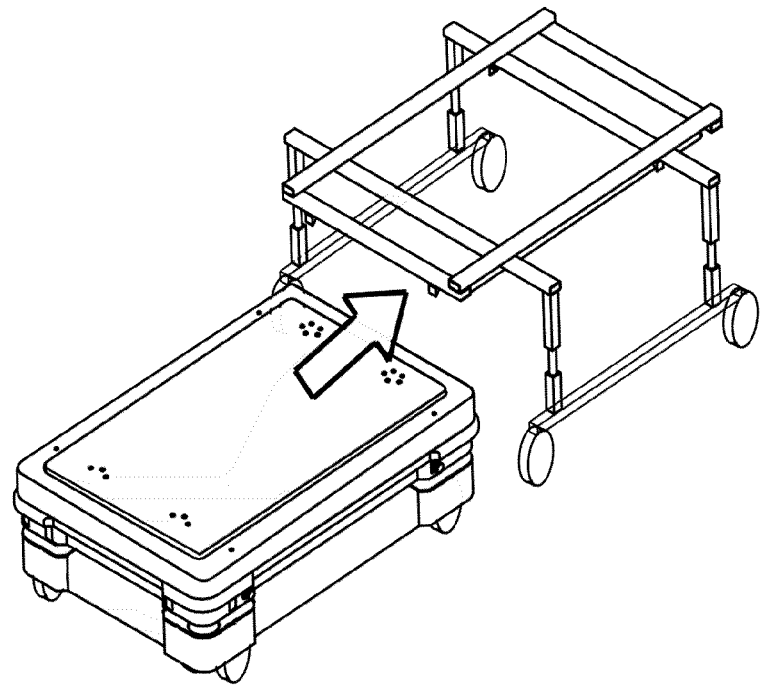
FIG. 5 depicts an embodiment of precise positioning and fastening of the AMR to the equipment to be moved, by employing the payload supporting members as the precise positioning landmarks for the AMR.
Figure 5:
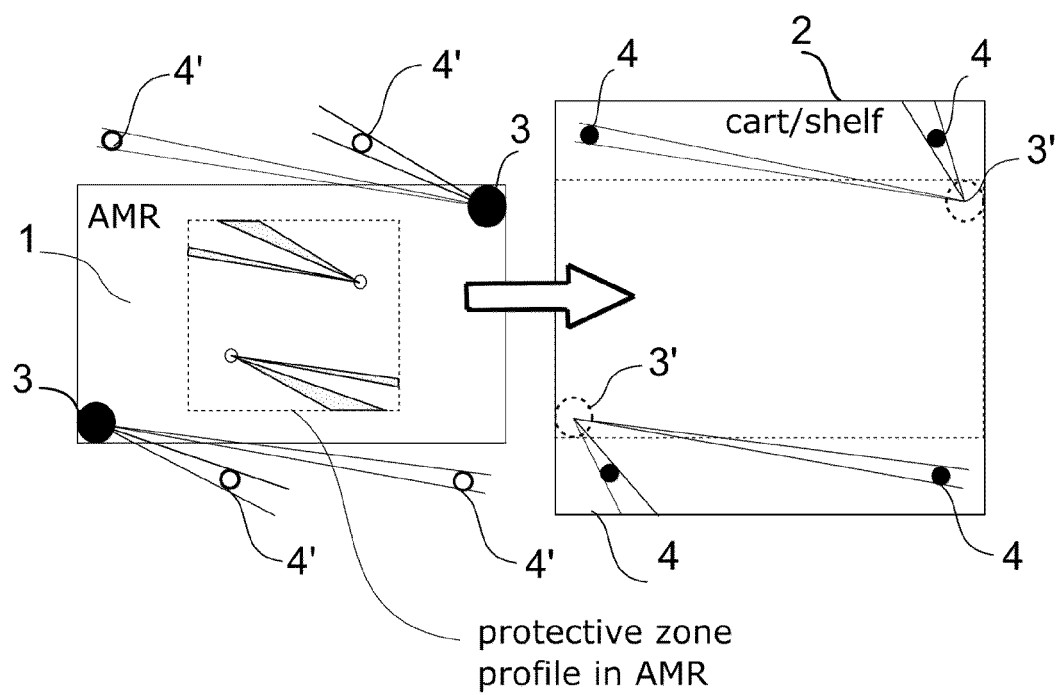
Figure 6:
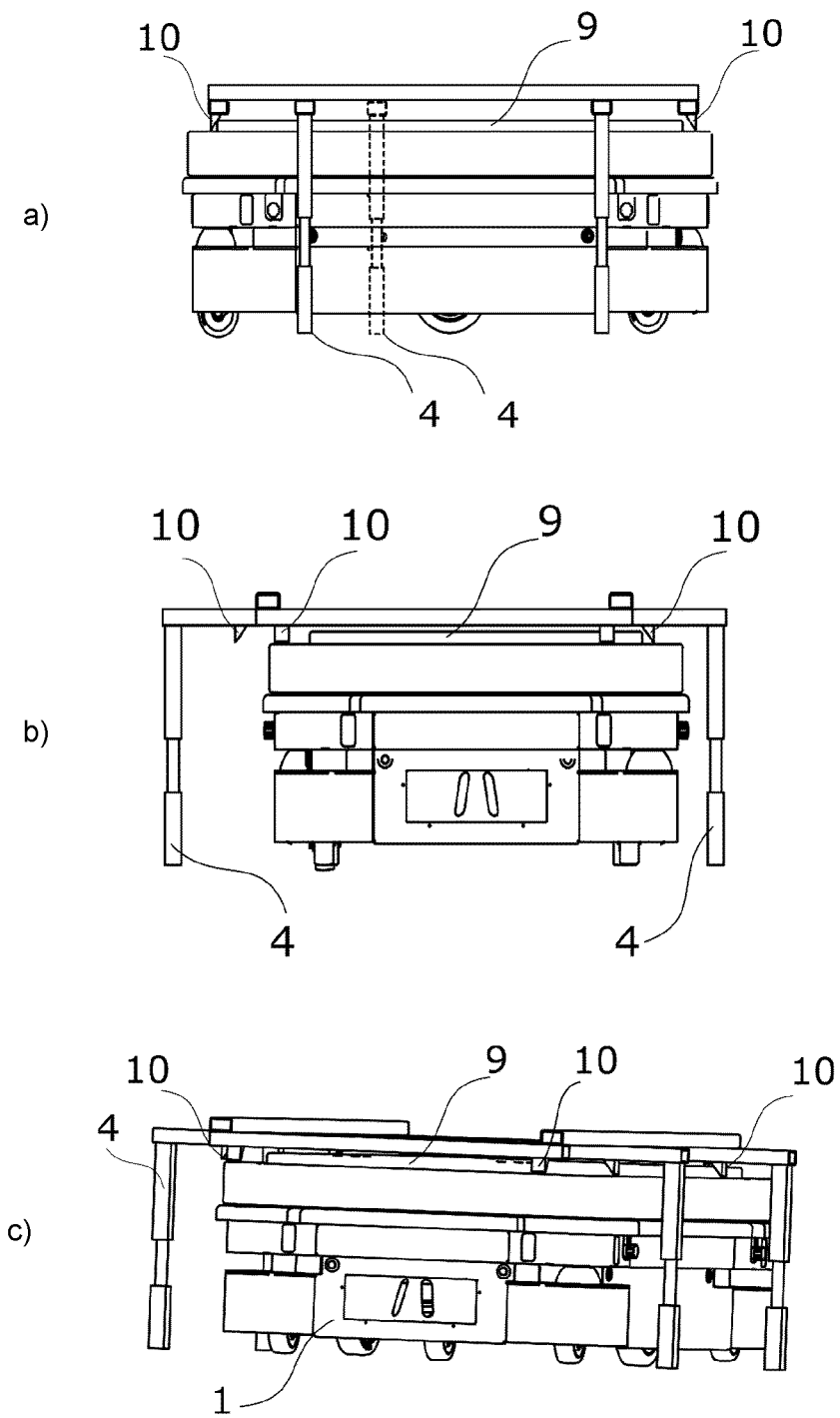
FIG. 6a-c depicts the construction of the cart/shelf frame and its supporting members when positioned, fixed or fastened onto the AMR during the payload transportation.

Additionally, if the blind spots 6 are narrow around the expected supporting members 4, the supporting members 4 would be ignored for the safety scanner system 3 as long as the cart 2 is in the correct position, but identified as an obstacle if the cart 2 is not in the correct position for fastening with the AMR 1. This feature can be used as a navigation help during the docking process, and it can be used as a warning if per example the cart/shelf 2 is gliding on the AMR, with a risk of falling off, while being moved. This embodiment for the precise docking of the AMR 1 to the cart/shelf 2 is depicted in FIG. 5, by employing the payload supporting members 4 as the precise positioning landmarks 4' for the AMR. Herein, the AMR 1 has the memory with the precise landmarks 4' which correspond to the supporting members 4 of the cart/shelf 2. When the AMR 1 docks under the cart/shelf 2, the exact docking position is indicated by matching said landmarks 4' with the supporting members 4 of the cart 2.

The control of the AMR driving and safety is ensured by control systems. The AMR comprises a safety scanner system with at least two safety scanners 3, preferably lidars, where the two safety scanners 3 are mounted on two opposite corners of the AMR 1, each safety scanner 3 scanning a 270° sector around the AMR (1). The safety scanner system also has a scanner control system adapted for being configured with different selectable protective zones 5 around the footprint of the AMR and the cart or shelf, respectively, where the different selectable protective zones 5 have different shapes and sizes, Further, AMR comprises a control system for autonomously driving and docking the AMR 1 under the cart or shelf 2, attaching it, and transporting the cart or shelf 2 to a predefined destination point. The control system for autonomously driving and docking the AMR 1 is adapted for sending control signals to the scanner control system for selecting one or several pre-configured profiles for protective zones 5 suitable for different operational modes of the AMR. The pre-configured protective zone profile (FIG. 5) which is selected whenever the cart or shelf 2 is attached to the AMR 1, is configured to have a size which is wider than the footprint of the cart 2 and to have a basically rectangular shape with wedge-shaped cut-outs (predefined blind zones 6 in the protective zone 5), so that correctly positioned and fixed supporting members 4 of the correctly attached cart/shelf 2 are excluded from the protective zone 5 by the selected preconfigured protective zone profile.

Additionally, during transporting the position of the AMR 1 to the cart/shelf 2 is is continuously checked by using the predefined positions 4' of the cart/shelf supporting members 4 and the wedge-shaped blind zone 6 in the active protective zone profile in order to identify whether the cart/shelf 2 stays in its correctly attached position during the transportation.

Although the present description includes numerous characteristics and advantages of the invention together with structural details and features, the description is given as an example of the invention embodiment. There may be changes in the details, especially in the form, size, and layout of materials without departing from the principles of the invention, in accordance with the widely understood definition of terms used in claims.

CITATION LIST

Non-Patent Literature

1. Sick safety scanners: https://cdn.sick.com/media/docs/3/13/613/Operating instructions S300 Safety laser scanner en IM0017613.PDF, page 70.

Patent Literature

2. Patent application US20170072558/U.S. Pat. No. 10,168,711B2 by Omron.
3. Patent application WO2019/063816 by ROEQ Aps.

The invention claimed is:

1. A system for transporting a payload, the system comprising:
   an autonomous mobile robot;
   a cart or shelf for holding the payload, the cart or shelf comprising supporting members, the cart or shelf being configured to enable the autonomous mobile robot to drive under the cart or shelf and to attach to, or to lift, the cart or shelf;
   the autonomous mobile robot comprising:
      controllable driving wheels configured to move the autonomous mobile robot in a forward direction and a backward direction and configured to turn the autonomous mobile robot around a vertical axis of the autonomous mobile robot;
      a safety scanner system comprising:
         at least two safety scanners, the at least two safety scanners being mounted on different regions of the autonomous mobile robot, each safety scanner for scanning an angular sector around part of the autonomous mobile robot; and
         a scanner control system configured to implement different selectable protective zones around a footprint of at least one of the autonomous mobile robot or the cart or shelf, where a first one of the different selectable protective zones has a different size or shape than a second one of the different selectable protective zones; and
   a control system for controlling (i) driving the autonomous mobile robot under the cart or shelf, (ii) attaching the autonomous mobile robot to the cart or shelf, and (iii) transporting the cart or shelf to a destination, the control system being configured to send one or more control signals to the scanner control system to select one or more profiles corresponding to the different selectable protective zones;
   wherein the control system is configured to send a control signal to the scanner control system to select a profile corresponding to a protective zone when the cart or shelf is attached to the autonomous mobile robot, the protective zone corresponding to the profile that is selected having a size that is wider and longer than the footprint of the cart or shelf, the protective zone corresponding to the profile that is selected defining blind zones, a blind zone corresponding to an angle interval extending from a safety scanner towards and including a location of a supporting member of the cart or shelf; and
   wherein the control system is configured to control the autonomous mobile robot not to slow or not to stop movement of the autonomous mobile robot when an obstacle is detected by the safety scanner in the blind zone.

2. The system of claim 1, wherein the autonomous mobile robot comprises sensors; and
   wherein the cart or shelf comprises a rectangular frame and the supporting members comprise four supporting members, where two of the four supporting members that are farthest away from the sensors are proximate to a corner of the cart or shelf and other two of the four supporting members are between a corner of the cart or shelf and a center of a side of the cart or shelf thereby forming an asymmetric supporting structure and a blind zone proximate to the center of the side of the cart or shelf.

3. A method for transporting the payload using the system of claim 1, the method comprising:
   driving the autonomous mobile robot into position under the cart or shelf to attach the autonomous mobile robot to the cart or shelf;
   attaching the autonomous mobile robot to the cart or shelf for transportation of the cart or shelf; and
   controlling, by the control system, the autonomous mobile robot to transport the cart or shelf to the destination;
   wherein the autonomous mobile robot is positioned under the cart or shelf based on predefined positions of the supporting members and blind zones in the protectives Zone for the profile that is selected.

4. The method of claim 3, further comprising checking a position of the autonomous mobile robot relative to the cart or shelf using the predefined positions in order to identify whether the cart or shelf remains correctly positioned during transportation.

5. The method of claim 4, wherein the position of the autonomous mobile robot relative to the cart or shelf is checked continuously.

6. The system of claim 1, wherein the vertical axis comprises a center axis of the autonomous mobile robot.

7. The system of claim 1, wherein the angular sector comprises a 270° sector.

8. The system of claim 1, wherein the different regions on which the at least two safety scanners are mounted comprise corners of the autonomous mobile robot.

9. The system of claim 8, wherein the corners comprises opposite corners of the autonomous mobile robot.

10. The system of claim 1, wherein at least one of the supporting members is at a corner of the autonomous mobile robot.

11. The system of claim 1, wherein the cart or shelf is configured to attach to the autonomous mobile robot.

12. The system of claim 1, wherein the at least two safety scanners comprise light detection and ranging (LIDAR) scanners.

13. An autonomous mobile robot configured to attach to a cart or shelf, the autonomous mobile robot comprising:
controllable driving wheels configured to move the autonomous mobile robot in a forward direction and a backward direction and configured to turn the autonomous mobile robot around a vertical axis of the autonomous mobile robot;
a safety scanner system comprising:
at least two safety scanners, the at least two safety scanners being mounted on different regions of the autonomous mobile robot, each safety scanner for scanning an angular sector around part of the autonomous mobile robot; and
a scanner control system configured to implement different selectable protective zones around a footprint of at least one of the autonomous mobile robot or the cart or shelf, where a first one of the different selectable protective zones has a different size or shape than a second one of the different selectable protective zones, and where the different selectable protective zones define-blind zones in which objects detected by a safety scanner within a corresponding protective zone are ignored, a blind zone corresponding to an angle interval extending from one of the at least two safety scanners towards and including a location of a supporting member of the cart or shelf; and
a control system for controlling (i) driving the autonomous mobile robot under the cart or shelf, (ii) attaching the autonomous mobile robot to the cart or shelf, and (iii) transporting the cart or shelf to a destination, the control system being configured to send one or more control signals to the scanner control system to select one or more profiles corresponding to the different selectable protective zones, the one or more profiles being associated with different operational modes of the autonomous mobile robot;
wherein the control system is configured to control the autonomous mobile robot not to slow or not to stop movement of the autonomous mobile robot when an obstacle is detected by a safety scanner in a blind zone.

14. The autonomous mobile robot of claim 13, wherein the control system is configured to send a control signal to the scanner control system select a profile corresponding to a protective zone when the cart or shelf is attached to the autonomous mobile robot, the protective zone corresponding to the profile that is selected having a size that is wider than the footprint of the cart or shelf and having a rectangular shape, the protective zone corresponding to the profile that is selected comprising blind zones corresponding to locations of multiple supporting members in the cart or shelf.

15. The autonomous mobile robot of claim 13, wherein the vertical axis comprises a center axis of the autonomous mobile robot.

16. The autonomous mobile robot of claim 13, wherein the angular sector comprises 270°.

17. The autonomous mobile robot of claim 13, wherein the different regions on which the at least two safety scanners are mounted comprise corners of the autonomous mobile robot.

18. The autonomous mobile robot of claim 17, wherein the corners comprises opposite corners of the autonomous mobile robot.

19. The autonomous mobile robot of claim 13, wherein the different regions on which the at least two safety scanners are mounted are on different sides of the autonomous mobile robot.

20. The autonomous mobile robot of claim 13, wherein the at least two safety scanners comprise light detection and ranging (LIDAR) scanners.

* * * * *